Jan. 31, 1961     E. P. DONNELLY, JR     2,970,279
STARTING CIRCUIT
Filed Oct. 21, 1957

INVENTOR.
EDWARD P. DONNELLY, JR.
BY
ATTORNEY

United States Patent Office 2,970,279
Patented Jan. 31, 1961

2,970,279
STARTING CIRCUIT

Edward P. Donnelly, Jr., Seattle, Wash., assignor, by mesne assignments, to the United States of America as represented by the Secretary of the Navy Filed Oct. 21, 1957, Ser. No. 691,349

4 Claims. (Cl. 331—108)

This application relates to a method of supplying surges or transients of energy for use in the operation of a load device which may be characterized by a need for a surge or transient of energy for the initiation of operation of said load device. This invention is more particularly directed to a method of starting transistor oscillators, and similar load devices, under abnormal starting conditions such as extreme cold, under slow rising energization voltages, and under heavy initial load conditions.

It has been observed that, particularly with regard to the operation of transistor oscillators, a surge of energy is desirable to insure the initiation of oscillations. This need for a surge or transient of current becomes acute where the oscillator or load device is to be operated in a remote location, such as, in a sonobuoy wherein a sea water activated battery, having a slowly rising voltage characteristic, is utilized as a source of energy for the oscillator or load device. Under these circumstances, the oscillator or load device frequently fails to operate. By utilizing the principle of my invention, one may be assured of the desired dependable operation of the load device.

It is therefore an object of my invention to provide a means for shunting the energization energy for a load means with an energy responsive switching means which provides an electrical discontinuity when the level of energy applied to the load device reaches a predetermined level.

It is another object of my invention to provide a relatively simple and inexpensive method of insuring the operation of transistor oscillators under abnormal starting conditions.

It is a still further object of my invention to provide a method of insuring the starting of transistor oscillators, or other load devices characterized by a need for a surge of energy for the initiation of operation, when the transistor oscillator or load device, is to be energized when in a remote location.

These and other objects and advantages of my invention will become apparent to those skilled in the art from a consideration of the appended, specification, claims, and drawing, in which:

Figure 1:
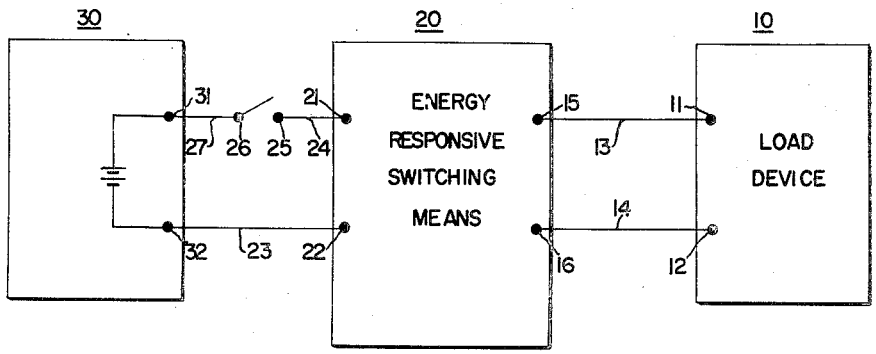
Figure 1 represents a block diagram of an embodiment of my invention in which a switching means for producing an electrical discontinuity in a shunt circuit for a load device is connected intermediate a source of energy and said load device.

Referring now to Figure 1; I have shown a load device, 10, having energization terminals 11 and 12; an energy responsive switching means, 20, having input terminals 21 and 22 and output terminals 15 and 16; and a source of energy, 30, having output terminals 31 and 32. Source of energy 30 may comprise a sea water activated battery and has output terminals 31 and 32 connected to input terminals 21 and 22 on energy responsive switching means 20 through conductor 27, movable switch contact 26, stationary switch contact 25, and conductor 24, and through conductor 23 respectively. Output terminals 15 and 16 on energy responsive switching device 20 are connected to input energization terminals 11 and 12 on load device 10 through conductors 13 and 14 respectively.

Operation of Figure 1

In Figure 1 it will readily be understood that the switching means comprised of movable contact 26 and stationary contact 25 may not be necessary where the source of energy 30 is, for instance, of the type that is self-energizing in response to a particular environmental condition. It will further be understood that the energy responsive switching means 20 may be any suitable device that has the characteristic of providing an electrical shunt across the energization circuit for the load means 10 under one condition, and, in response to a second condition, removes the electrical shunt to supply full energy from the source of energy 30 to the load device 10. Therefore, assuming for the moment, as mentioned above, that the source of energy 30 is a sea water activated battery which has a slowly rising voltage characteristic, the switch comprised of movable contact 26 and stationary contact 25 may be closed and the battery immersed in sea water to initiate its activation. For a period of time, the energy flow is shunted through the energy responsive switching means 20 and the energy flowing through the load device 10 remains negligible. After a short period of time, the level of energy supplied by the source of energy 30 reaches the predetermined level at which the energy responsive switching means becomes operative to remove the shunt circuit and allow a surge of energy to flow, initially, to the load device 10. This surge of energy is sufficient to initiate the operation of load device 10.

Figure 2:
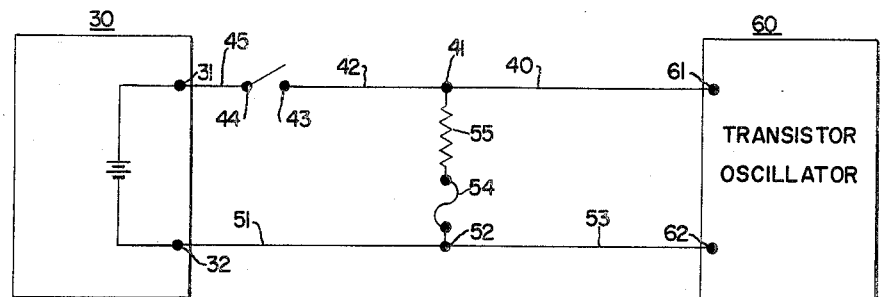
Figure 2 is an electrical schematic showing a further embodiment of my invention in which the switching means is shown as a fuse.

Referring now to Figure 2, a transistor oscillator 50 having input terminals 11 and 12 is shown connected in circuit with a source of energy 30 having output terminals 31 and 32. Output terminal 31 on source of energy 30 is connected to terminal 11 on transistor oscillator 50 through a conductor 45, movable switch contact 44, stationary switch contact 43, conductor 42, terminal 41, and conductor 40. Output terminal 32 on source of energy 30 is connected to terminal 12 on transistor oscillator 50 through conductor 51, terminal 52, and conductor 53. Connected in shunt across the input terminals 11 and 12 of transistor oscillator 50 are a resistor 55 and a fuse 54. Transistor oscillator 50 may be of the type shown and described in U.S. Patent Number 2,783,384, issued February 26, 1957 in the names of Bright et al.

Operation of Figure 2

The operation of Figure 2 is similar to that of Figure 1 in that an energy responsive switching means, fuse 54, is utilized to provide a shunt across the input terminals of transistor oscillator 50 below a predetermined level of energy and is adapted to provide a discontinuity or open circuit across the input terminals of transistor oscillator 50 when the energy rises above a predetermined level. Assuming again that the source of energy 30 has a slowly rising voltage characteristic, it is seen that when the switch comprising movable contact 44 and stationary contact 43 is closed, the flow of current or energy from the source of energy 30 is primarily through the shunt circuit comprising resistor 55 and fuse 54. At such time as the current or energy flow through the shunt circuit reaches a predetermined value, the fuse melts and provides a discontinuity in the shunt circuit so that a surge of energy is supplied to the transistor oscillator 50 to cause it to break into oscillation.

Other embodiments and applications of my invention will be readily apparent to those skilled in the art and I therefore wish to be limited only by the scope of the appended claims.

I claim:
1. In combination, transistor oscillator means, a power supply means for energizing said oscillator means, said power supply means having a slowly rising voltage characteristic upon activation; and circuit means connecting said power supply means in energizing relationship with said oscillator means, said circuit means including means for producing a current surge when the output voltage of said power supply means increases to a predetermined value so as to insure the starting of said oscillator means.

2. The combination of claim 1 wherein said power supply means comprises a battery and wherein said means for producing a current surge comprises a fusible element connected mutually in shunt with said battery and said oscillator.

3. In combination, a load device of the type requiring a surge of current therethrough to initiate operation thereof, a power supply means for energizing said load device, said power supply means having a slowly rising voltage characteristic upon activation, and circuit means connecting said power supply means in energizing relationship with said load device, said circuit means including means for producing a current surge when the output voltage of said power supply means increases to a predetermined value so as to insure the starting of said load device.

4. The combination of claim 1 wherein said power supply means comprises a battery and wherein said means for producing a current surge comprises a fusible element connected mutually in shunt with said battery and said load device.

References Cited in the file of this patent

UNITED STATES PATENTS

| | | |
|---|---|---|
| 1,110,548 | Hewitt | Sept. 15, 1914 |
| 2,440,861 | Lamb | May 4, 1948 |
| 2,600,330 | Ross | June 10 1952 |
| 2,697,216 | Lee | Dec. 14, 1954 |
| 2,703,053 | Castel | Mar. 1, 1955 |
| 2,783,384 | Bright et al. | Feb. 26, 1957 |
| 2,882,520 | Salzer et al. | Apr. 14, 1959 |

FOREIGN PATENTS

| | | |
|---|---|---|
| 740,670 | Great Britain | Nov. 16, 1955 |